UNITED STATES PATENT OFFICE.

BERNARD REINUS, OF PATERSON, NEW JERSEY.

PROCESS OF PURIFYING TANNIC ACID.

SPECIFICATION forming part of Letters Patent No. 517,626, dated April 3, 1894.

Application filed April 8, 1893. Serial No. 469,561. (No specimens.)

*To all whom it may concern:*

Be it known that I, BERNARD REINUS, a citizen of the United States, residing at Paterson, in the county of Passaic, and in the State of New Jersey, have invented a certain new and useful process for purifying tannic acids and for recovering them from the tannate of lead which may contain them alone or with their impurities; and I do hereby declare that the following is a full and exact description of it.

Repeated attempts have been made heretofore for purifying tannic acid by means of acetate of lead. These attempts were not successful for the reason that the acetate of lead carried away a large quantity of the tannic acid with the impurities and diminished thereby the strength of the remaining solution. Moreover no means were known by which the tannic acid could be easily recovered from the precipitate, except with a considerable waste and loss of tannic acid.

The object of my invention is to furnish an improved process of purifying tannic acid contained in the extracts of nutgall, sumac, &c., and the invention consists, first in treating the solution of tannic acid with sugar of lead so as to precipitate the impurities from the same, next in separating the precipitate from the purified solution by filtration, next, mixing the filtered solution again with acetate of lead so as to precipitate tannate of lead, next filtering the precipitated tannate of lead and subjecting the same to the action of oxalic acid or any other acid which forms an insoluble compound with lead, whereby the tannic acid is obtained in purified and concentrated state.

In carrying out my improved process, a solution of tannic acid of from 10° to 15° Baumé of about nine parts by weight is mixed with a solution of half a part by weight or acetate of lead and water under continuous stirring. This is preferably done in a suitable agitator or mixer, so that an intimate mixing of the tannic acid solution and the acetate of lead solution is obtained. The acetate of lead combines with some of the tannic acid in the solution and also unites itself with the impurities contained in the same, so as to form a precipitate, which is separated from the solution by filtration, so that a purified tannic acid solution of much lighter color and of a density of about 8° Baumé is obtained. This solution is placed back into the agitator and mixed under constant stirring with a solution of acetate of lead in excess, by which the entire quantity of tannic acid in the solution will be combined with the lead and precipitated in the form of tannate of lead to the bottom of the mixing vessel. The remaining liquor is then decanted and filtered, preferably by means of a filter-press, said liquor containing nothing but the excess of the solution of acetate of lead and acetic acid, while the precipitate is composed of tannate of lead.

For the purpose of recovering the tannic acid, the precipitated tannate of lead is subjected to the action of oxalic acid which decomposes the tannate of lead, forming tannic acid which is dissolved, and insoluble oxalate of lead. The tannic acid is then filtered off and obtained in a highly concentrated and pure state and requires no further treatment. In place of oxalic acid any other acid can be used that forms with lead an insoluble compound, as for instance phosphoric acid. The tannic acid contained in the first precipitate is recovered by subjecting it to the same process, namely the treatment with oxalic acid, filtering off the insoluble oxalate of lead from the concentrated impure tannic acid solution and subjecting the obtained impure tannic acid to the purifying process hereinbefore described. Frequently it happens that the first treatment of the tannic acid with the acetate of lead solution is insufficient to entirely purify the tannic acid and it becomes necessary to submit it to another purification before the tannic acid is separated from the solution. By treating the extract tannic acid twice in succession with an acetate of lead solution the principal impurities will be in the first precipitate, while the second precipitate will contain a comparatively pure tannate of lead as the same is admixed with a comparatively small quantity of impurities. As the precipitated tannate of lead is not crystalline but forms a loose voluminous deposit it can only be filtered with some difficulty, if therefore, the entire quantity of acetate of lead is added to the solution of the tannic acid extract, a comparatively large quantity of tannate of lead mixed with impurities is precipitated, which can be more easily treated by dividing the purifying operation and accomplishing the same in two successive steps.

Having thus described my invention, I claim as new and desire to secure by Letters Patent—

1. The process herein described of purifying tannic acid contained in the ordinary tannic extracts of commerce, which consists in mixing the tannic acid solution with a solution of acetate of lead so as to precipitate from the tannic acid solution a portion of the tannate of lead with the impurities contained in the same, filtering off the precipitate from the purified solution of tannic acid, treating the purified tannic acid solution with a solution of acetate of lead in excess so as to precipitate tannate of lead, subjecting the precipitated tannate of lead to the action of oxalic acid or any other acid which forms an insoluble compound with lead, and filtering off the pure and concentrated tannic acid from the insoluble precipitate, substantially as set forth.

2. A process herein described of purifying tannic acid contained in the ordinary tannic extracts of commerce, which consists in mixing the tannic acid solution with a solution of acetate of lead so as to precipitate from the tannic acid solution a portion of the tannate of lead with the impurities contained in the same, separating the precipitated tannate of lead with the impurities from the solution of tannic acid, subjecting the tannate of lead in the precipitate to the action of oxalic acid so as to form an insoluble oxalate of lead and tannic acid solution, filtering off the insoluble oxalate of lead from the impure tannic acid solution, and purifying the solution in the same manner as the ordinary commercial tannic extracts, substantially as set forth.

BERNARD REINUS.

Witnesses:
F. F. SEARING,
F. W. SUTTLE.